(12) United States Patent
Park et al.

(10) Patent No.: US 11,134,286 B2
(45) Date of Patent: Sep. 28, 2021

(54) METHOD AND DEVICE FOR PROVIDING CONTENT

(71) Applicant: SAMSUNG ELECTRONICS CO., LTD., Suwon-si (KR)

(72) Inventors: Pil-kyu Park, Seongnam-si (KR);
Kwang-pyo Choi, Gwacheon-si (KR);
Woong-il Choi, Osan-si (KR);
Myung-ho Kim, Seoul (KR);
Sung-chan Kim, Suwon-si (KR);
Jeong-hoon Park, Seoul (KR);
Hee-chul Yang, Seoul (KR);
Chang-hyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/486,077

(22) PCT Filed: Feb. 9, 2018

(86) PCT No.: PCT/KR2018/001743
§ 371 (c)(1),
(2) Date: Aug. 14, 2019

(87) PCT Pub. No.: WO2018/151467
PCT Pub. Date: Aug. 23, 2018

(65) Prior Publication Data
US 2020/0059677 A1 Feb. 20, 2020

(30) Foreign Application Priority Data

Feb. 15, 2017 (KR) .................. 10-2017-0020709

(51) Int. Cl.
*H04N 21/239* (2011.01)
*H04N 21/2381* (2011.01)
(Continued)

(52) U.S. Cl.
CPC ..... *H04N 21/2393* (2013.01); *H04N 21/2381* (2013.01); *H04N 21/25891* (2013.01);
(Continued)

(58) Field of Classification Search
CPC .......... H04N 21/2393; H04N 21/2381; H04N 21/25891; H04N 21/4532; H04N 21/472;
(Continued)

(56) References Cited

U.S. PATENT DOCUMENTS 6,411,725 B1 * 6/2002 Rhoads ................. G10L 19/018
382/100
6,718,551 B1 4/2004 Swix et al.
(Continued)

FOREIGN PATENT DOCUMENTS

JP       2005-6105 A      1/2005
KR    10-0900968 B1       6/2009
(Continued)

OTHER PUBLICATIONS

Search Report dated Jun. 4, 2018, issued by the International Searching Authority in International Application No. PCT/KR2018/001743 (PCT/ISA/210).
(Continued)

*Primary Examiner* — Alexander Gee
(74) *Attorney, Agent, or Firm* — Sughrue Mion, PLLC

(57) ABSTRACT

Provided is a method, performed by a terminal, of providing content includes determining whether at least one content is included in preference content, based on information about the at least one content provided to the terminal and preference information of a user of the terminal about content; content, which is not included in the preference content, is present in the at least one content, transmitting, to a server, a request to change the first content to second content included in the preference content based on previously (Continued)

stored information about the preference content; and outputting the second content received from the server, in response to the request.

16 Claims, 12 Drawing Sheets

(51) Int. Cl.
  *H04N 21/258* (2011.01)
  *H04N 21/45* (2011.01)
  *H04N 21/472* (2011.01)
  *H04N 21/643* (2011.01)
  *H04N 21/234* (2011.01)
  *H04N 21/81* (2011.01)

(52) U.S. Cl.
  CPC ....... *H04N 21/4532* (2013.01); *H04N 21/472* (2013.01); *H04N 21/64322* (2013.01)

(58) Field of Classification Search
  CPC ......... H04N 21/64322; H04N 21/2353; H04N 21/251; H04N 21/258; H04N 21/25808; H04N 21/25866; H04N 21/441; H04N 21/44204; H04N 21/44213; H04N 21/44222; H04N 21/4508; H04N 21/454
  See application file for complete search history.

(56) References Cited

U.S. PATENT DOCUMENTS

| | | | |
|---|---|---|---|
| 7,860,996 B2 | 12/2010 | Musayev et al. | |
| 8,898,711 B2 | 11/2014 | Choi et al. | |
| 9,032,433 B2 | 5/2015 | Kaftan | |
| 8,966,520 B2 | 12/2015 | Tom et al. | |
| 10,277,928 B1* | 4/2019 | Joliveau | H04N 21/26258 |
| 2004/0194130 A1 | 9/2004 | Konig et al. | |
| 2004/0261096 A1 | 12/2004 | Matz | |
| 2007/0169148 A1* | 7/2007 | Oddo | H04N 21/4383 725/46 |
| 2007/0260627 A1* | 11/2007 | Knittel | G06Q 30/02 |
| 2012/0144420 A1 | 6/2012 | Del Sordo et al. | |
| 2013/0343598 A1* | 12/2013 | Kocks | H04N 21/251 382/100 |
| 2014/0132843 A1* | 5/2014 | Zentner | H04N 21/6581 348/731 |
| 2014/0226671 A1* | 8/2014 | Broome | H04L 65/601 370/400 |
| 2014/0344855 A1* | 11/2014 | Morrow | H04N 21/4622 725/34 |
| 2016/0323625 A1* | 11/2016 | Casagrande | H04N 21/4263 |

FOREIGN PATENT DOCUMENTS

| | | |
|---|---|---|
| KR | 10-2011-0031787 A | 3/2011 |
| KR | 10-2014-0075135 A | 6/2014 |
| WO | 99/66719 A1 | 12/1999 |
| WO | 2005/046234 A1 | 5/2005 |

OTHER PUBLICATIONS

Written Opinion dated Jun. 4, 2018, issued by the International Searching Authority in International Application No. PCT/KR2018/001743 (PCT/ISA/237).
Communication dated Nov. 11, 2019, from the European Patent Office in counterpart European Application No. 18754229.5.
Communication dated Jul. 24, 2020, from the European Patent Office in counterpart European Application No. 18754229.5.
Communication dated Jan. 25, 2021 by the Korean Intellectual Property Office in Korean Application No. 10-2017-0020709.
Communication dated Apr. 7, 2021 by the European Patent Office in European Application No. 18 754 229.5.

* cited by examiner

METHOD AND DEVICE FOR PROVIDING CONTENT

TECHNICAL FIELD

The present disclosure relates to a method of providing content, a device for providing content, and a computer-readable recording medium having recorded thereon a program for executing the method of providing content.

BACKGROUND ART

With the development of information technology (IT) technology and the Internet, various services for providing content to users are being developed. In particular, conventionally, a television (TV) service for receiving a broadcast signal through a broadcast medium such as a terrestrial wave, a satellite, or cable has been provided to a user. Recently, an Internet Protocol television (IPTV) service for transmitting and receiving a broadcast signal in an IP packet through IP is being activated. The Internet Protocol television (IPTV) service is a service that provides information services, video content, and broadcasting services to a TV through an IP network, that is, broadband Internet. The convergence service of communication and broadcasting is regularized, and interest in an IPTV service is rising. The activation of the IPTV service is expected to have a significant impact on the communication and broadcasting industries as well as on the content and consumer electronics industries.

IPTV is not different from general cable broadcasting or satellite broadcasting in that it provides broadcasting content including video, but it has a big feature that it adds interactivity.

DESCRIPTION OF EMBODIMENTS

Technical Problem

Provided are a method and device for providing content, whereby a terminal may request a server for content and receive the content from the server, the content being determined based on information about a user from among a plurality of contents that are providable to the terminal, and may selectively provide the user with the content that is appropriate for the user.

Solution to Problem

Provided is a method, performed by a terminal, of providing content including determining whether at least one content is included in preference content, based on information about the at least one content provided to the terminal and preference information of a user of the terminal about content; content, which is not included in the preference content, is present in the at least one content, transmitting, to a server, a request to change the first content to second content included in the preference content based on previously stored information about the preference content; and outputting the second content received from the server, in response to the request.

BEST MODE

Figure 1:
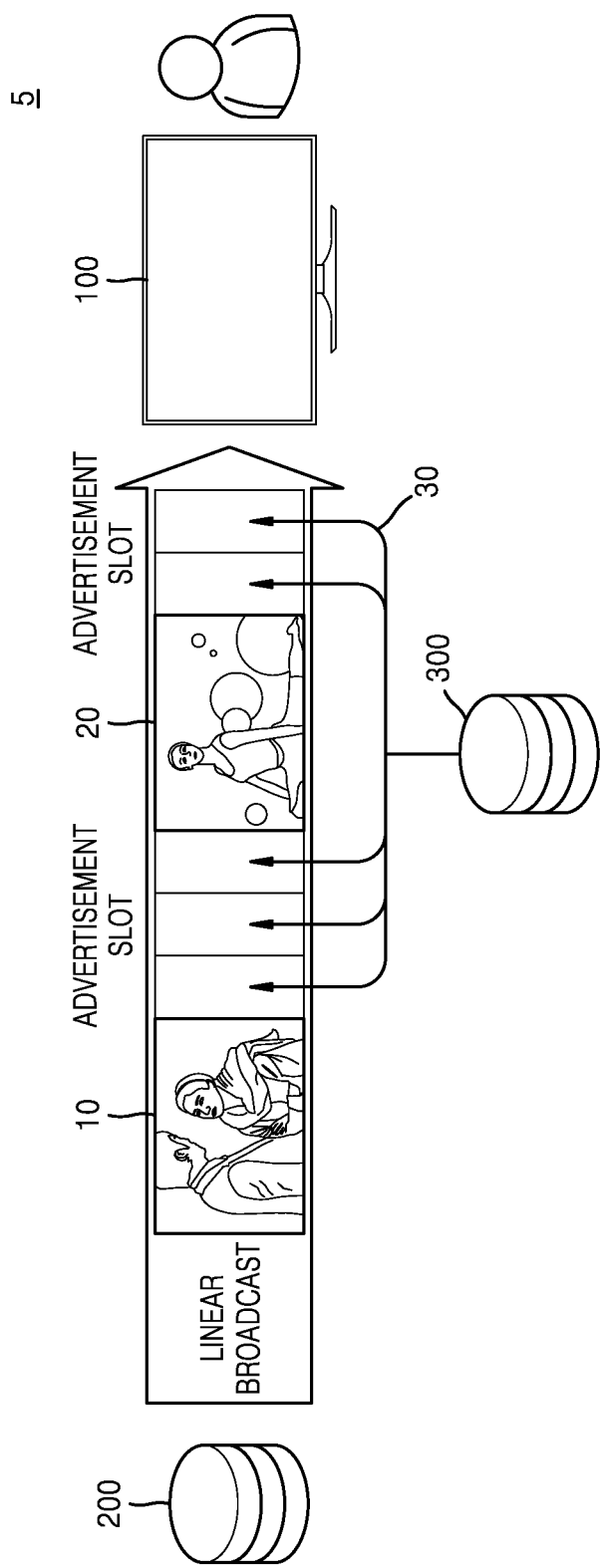
FIG. 1 is a diagram for describing a system for providing content, according to an embodiment.

When it is determined that first content, which is not included in the preference content, is present in content, transmitting, to a server, a request to change first content to second content included in the preference content based on previously stored information about the preference content; and outputting the second content received from a server, in response to the request.

A method, performed by a terminal, of providing content further includes generating the preference information of a user about the content based on user information comprising at least one of a profile or an activity history of the user of the terminal.

In the method, performed by the terminal, of providing content, the information about at least one content may include at least one of identification information of the at least one content, information about a time when each of the at least one content is provided, or content change information indicating whether the at least one content is changeable to another content.

In the method, performed by the terminal, of providing content, the determining includes determining whether first content that is not included in preference content is changeable content, based on content change information, and the transmitting includes transmitting a request to the server when it is determined that the first content that is not included in the preference content is the changeable content.

In the method, performed by the terminal, of providing content, the information about the at least one content may include identification information of a plurality of contents which are providable for each predetermined time, the method may further include when a plurality of contents that may be provided at a specific time are present, transmitting a request for content included in the preference content among the plurality of contents.

In the method, performed by the terminal, of providing content, the request may include identification information of the second content and information about a time when the first content to be changed is provided.

In the method, performed by the terminal, of providing content, the transmitting includes transmitting the request before a predetermined buffer time from when the first content is provided.

The method, performed by the terminal, of providing content may further include receiving a user input of selecting second content from among at least one content included in preference content.

The method, performed by the terminal, of providing content may further include updating preference information based on at least one of a reproduction duration of received second content or a reproduction count.

According to an embodiment, a method, performed by a first server, for providing content includes generating information about at least one content including identification information of at least one content that may be provided to a terminal, information about a time when the at least one content is provided, and content change information indicating whether the at least one content may be changed to another content; and transmitting the information about the at least one content to the terminal, wherein it is determined whether the at least one content provided to the terminal is changed based on the information about the at least one content.

According to an embodiment, a method, performed by a second server, for providing content includes a terminal receiving a content change request determined based on information about at least one content including identification information of the at least one content, information about a time when the at least one content is provided, and content change information indicating whether the at least one content may be changed to another content; selecting any one of a plurality of previously stored contents based on the content change request, and transmitting the selected content to the terminal.

According to an embodiment, a terminal for providing content includes a processor configured to determine whether at least one content is included in preference content, based on information about the at least one content provided to a terminal and preference information of a user of the terminal about content; a communicator configured to, when it is determined that first content, which is not included in the preference content, is present in the at least one content, transmit, to a server, a request to change the first content to second content included in the preference content based on previously stored information about the preference content; and an output unit configured to output the second content received from the server in response to the request.

According to an embodiment, a first server for providing content includes a processor configured to generate information about at least one content including identification information of at least one content that may be provided to a terminal, information about a time when the at least one content is provided, and content change information indicating whether the at least one content may be changed to another content; and a communicator configured to transmit the information about the at least one content to the terminal, wherein it is determined whether the at least one content provided to the terminal is changed based on the information about the at least one content.

According to an embodiment, a second server for providing content includes a communicator configured to receive a content change request determined based on information about at least one content including identification information of the at least one content, information about a time when the at least one content is provided, and content change information indicating whether the at least one content may be changed to another content; and a processor configured to select any one of a plurality of previously stored contents based on the content change request, wherein the communicator transmits the selected content to the terminal.

MODE OF DISCLOSURE

Terms used herein will be described in brief, and the disclosure will be described in detail.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. The term used in the embodiments such as "unit" or "module" indicates a unit for processing at least one function or operation, and may be implemented in hardware, software, or in a combination of hardware and software.

Hereinafter, embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure, parts that are not associated with the description have been omitted from the drawings, and throughout the specification, identical reference numerals refer to identical parts.

FIG. 1 is a diagram for describing a system 5 for providing content, according to an embodiment.

Referring to FIG. 1, the system 5 for providing content may include a terminal 100, a first server 200, and a second server 300. However, all illustrated components are not indispensable components. The system 5 for providing content may be implemented by more components than the illustrated components. The system 5 for providing content may be implemented by fewer components than the illustrated components.

For example, in the system 5 for providing content, the first server 200 and the second server 300 may be included in one device. In addition, according to another example, the system 5 for providing content may further include a server other than the first server 200 and the second server 300.

The terminal 100 according to an embodiment may obtain information about at least one content from the first server 200. For example, the terminal 100 may obtain metadata of content or an electronic program guide (EPG). In addition, the information about the at least one content may include identification information of the at least one content, information about a time when each of the at least one content is provided, and content change information indicating whether the at least one content may be changed to another content.

The terminal 100 may identify the at least one content provided to the terminal 100 based on the information about the at least one content. For example, the terminal 100 may identify a first broadcast program 10 and a second broadcast program 20 being provided at times t1 and t5, respectively, and an advertisement 30 being provided at times t2, t3, t4, t6, and t7. In the present embodiment, the first and second broadcast programs 10 and 20 are provided from the first server 200, but this is merely an embodiment and the present disclosure is not limited thereto. According to another example, the terminal 100 may receive broadcast programs from the first server 200 that provides the information about the at least one content and another server.

Meanwhile, the terminal 100 may request a change of at least a part of the information about the at least one content. For example, the terminal 100 may determine whether content that is not preferred by a user is present among the at least one content based on the information about the at least one content and preference information of the user about content. Here, the preference information may include a keyword, etc. indicating an object preferred by the user that is determined based on a content viewing history of the user, a purchase history, an application usage history, a search history, a social networking service (SNS) activity history, sex, age, a residence area, etc. For example, the preference information may include a sports car, a movie actor A, a brand B, and the like.

For example, as a result of comparing the advertisement 30 provided at t2, t3, t4, t6 and t7 with the preference information of the user, the terminal 100 may determine that the user will not prefer advertisements provided at t3 and t4.

The terminal 100 according to an embodiment may transmit a request, to the second server 300 providing an advertisement to the terminal 100, to change the advertisements determined that the user will not prefer to another advertisement. For example, the terminal 100 may transmit a request, to the second server 300, to change a predetermined advertisement A to an advertisement B. However, this is merely an embodiment and a server to which the terminal 100 transmits the request to change the advertisement is not limited to the second server 300. According to another example, the terminal 100 may transmit the request to change the advertisement to another server storing the advertisement B.

The system 5 for providing content according to an embodiment may provide a viewing environment in which the user may view the preferred content, by allowing the terminal 100 to select and change content that the user of the terminal 100 does not prefer, based on the information about the at least one content provided to the terminal 100.

Figure 2:
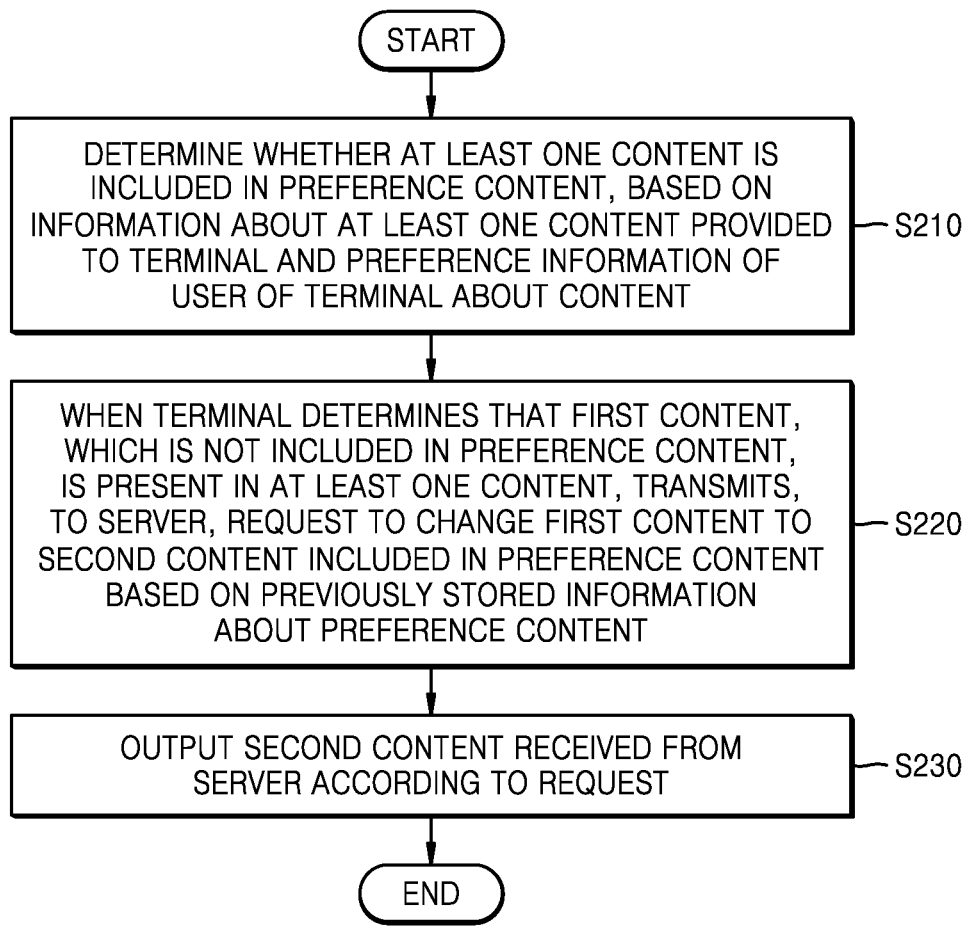
FIG. 2 is a flowchart illustrating a method, performed by a terminal, of providing content, according to an embodiment.

FIG. 2 is a flowchart illustrating a method, performed by a terminal, of providing content, according to an embodiment.

In operation S210, the terminal determines whether at least one content is included in preference content, based on information about the at least one content provided to the terminal and preference information of a user of the terminal about content.

The terminal according to an embodiment may obtain the information about the at least one content provided to the terminal from a server. For example, the terminal may obtain EPG or metadata for the at least one content from the server.

On the other hand, the information about the at least one content may include identification information of the content. The identification information of the content may include, for example, title of the content, genre, plot, age rating, and information about a person, a commodity, a commodity brand, and the like displayed on the at least one content. Further, the information about the at least one content may include information about a time when the content is provided. For example, the information about the time when the content is provided may include information about a start time and an end time of the content. The information about the at least one content may include content change information indicating whether the content may be changed to another content. For example, the content change information may indicate a case where the content may be changed, a case where the content may not be changed, a case where the content may be changed only to any one of contents included in a predetermined content list, and the like.

The terminal may obtain the preference information of the user of the terminal about the content. The terminal according to an embodiment may generate a keyword indicating content preferred by the user, based on at least one of a content viewing history of the user of the terminal, a purchase history, an application usage history, a search history, an SNS activity history, sex, age, or a residence area. For example, when content mainly watched by the user is an action movie in which an actor A appears, the terminal may generate, as the keyword, a name of the actor A, another content in which the actor A appears, a name of a product that the actor A advertises, etc. According to another embodiment, the terminal may obtain the preference information of the user based on a user input. For example, the terminal may obtain keyword preference information directly input by the user.

The terminal according to an embodiment may compare the information about the at least one content with the preference information of the user of the terminal about the content to determine whether the at least one content is included in the preference content. For example, the terminal may determine similarity between the preference information and the information about the at least one content to determine whether the at least one content is included in the preference content.

In operation S220, when the terminal determines that first content, which is not included in the preference content, is present in the at least one content, the terminal transmits, to the server, a request to change the first content to second content included in the preference content based on previously stored information about the preference content.

The terminal according to an embodiment may change the content when content that is not included in the preference content is included in the at least one content as a result of comparing the information about the at least one content to the preference information. For example, the terminal may transmit a request to change the first content, which is not included in the preference content, to the second content included in a previously stored list of preference contents, to the server where the second content is stored. Here, the previously stored list of preference contents may include identification information of the preference content and information about a location (e.g., a Uniform Resource Locator (URL)) of the server where the preference content may be provided.

In operation S230, the terminal outputs the second content received from the server according to the request.

The terminal according to an embodiment may receive the requested second content from the server. Here, in order to provide the second content seamlessly to the user of the terminal, the server may provide the second content to the terminal before a predetermined buffer time tb from a provision time t1 of the first content that is a change target.

In addition, the terminal may output the received second content.

The terminal according to an embodiment may store a reproduction duration of the second content, a reproduction count of the second content, and the like as feedback information, and update the preference information of the user based on the stored feedback information.

Figure 3:
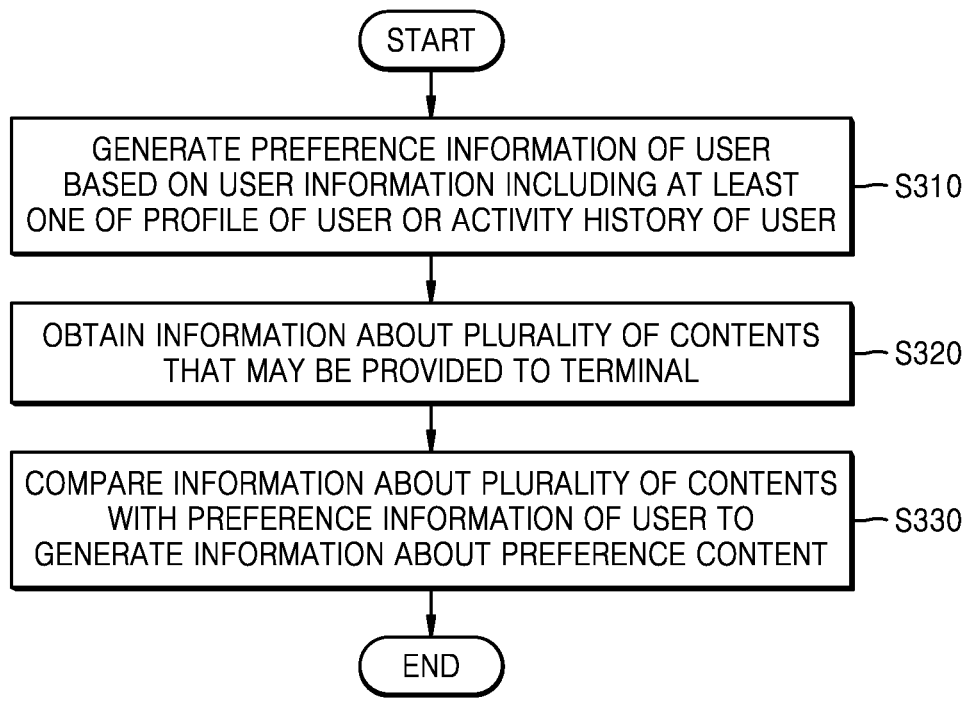
FIG. 3 is a flowchart illustrating a method, performed by a terminal, of generating preference information, according to an embodiment.

FIG. 3 is a flowchart illustrating a method, performed by a terminal, of generating preference information according to an embodiment.

In operation S310, the terminal may generate preference information of a user based on user information including at least one of a profile of the user or an activity history of the user.

The profile of the user according to an embodiment may include information about sex, age, residence area, etc. of the user. Also, the activity history of the user may include information about a content viewing history of the user, a purchase history, a search history, a social networking service (SNS) activity history, etc. However, this is merely an embodiment, and the information about the profile of the user and the activity history of the user is not limited to the above-described example.

The terminal according to an embodiment may generate the preference information of the user based on information preferred in a demographic hierarchy in which the user is included based on the profile of the user. For example, when the user is a male in his early thirties as a result of determining based on the profile of the user, the terminal may generate a keyword indicating automobile, action movie, sports game, and the like as the preference information of the user.

The terminal according to an embodiment may generate the preference information of the user including a keyword indicating a user's taste, a field of interest, etc. based on the activity history of the user. For example, the terminal may generate the keyword as the preference information of the user indicating a product purchased for more than a predetermined number of times through Internet shopping and an object that has been searched more than a predetermined number of times through a search application.

Also, the terminal according to an embodiment may generate the preference information of the user by combining the profile of the user and the activity history of the user.

In operation S320, the terminal may obtain information about a plurality of contents that may be obtained by the terminal.

The terminal according to an embodiment may obtain the information about the plurality of contents obtained by the terminal from a second server described above with reference to FIG. 2. Here, the second server may be, for example, an advertisement providing server. The information about the plurality of contents may include information about an object included in each of the plurality of contents. For example, when at least one of the plurality of contents is an advertisement, a name of a product that is an advertisement target, a name of a company to sell the advertisement target, etc. may be included in the information about the plurality of contents.

In operation S330, the terminal may compare the information about the plurality of contents with the preference information of the user to generate information about preference content.

As a result of comparing information about the plurality of contents with the preference information of the user, the terminal according to an embodiment may select, as the preference content, content having similarity to the preference information of the user that is equal to or greater than a preset value. The terminal may generate information about the preference content based on identification information of the selected preference content.

For example, when the preference information of the user includes a keyword such as a smart phone or a wearable device, etc., the terminal may select content A and content B related to the smart phone and the wearable device among the plurality of contents, based on the information about the plurality of contents. Accordingly, the terminal may generate the information about the preference content including identification information of the selected content A and content B.

Figure 4:
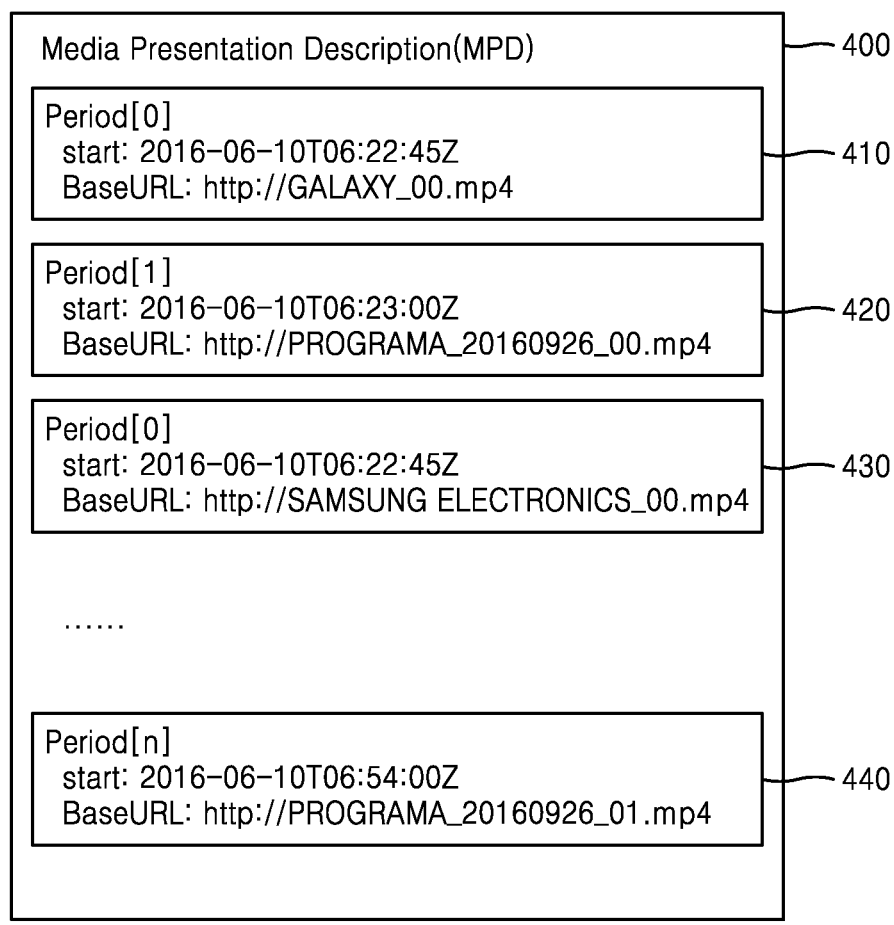
FIG. 4 is a diagram for explaining information about at least one content provided to a terminal according to an embodiment.

FIG. 4 is a diagram for explaining information 400 about at least one content provided to a terminal according to an embodiment.

Referring to FIG. 4, the terminal may receive a file including the information about the at least one content from a first server. Here, the file may be explained as media presentation description (MPD) according to Moving Picture Expert Group Dynamic Adaptive Streaming over HTTP (MPEG-DASH). The information 400 about the at least one content may include information 420 and 440 about provided programs as well as information 410 and 430 about advertisements provided before and after the programs.

In addition, the information 400 about the at least one content may be aligned by a period in which content is reproduced. The terminal may confirm scheduling information, through the information 400 about the at least one content, that an advertisement about Galaxy Note is provided in a first period period[0], a program A is provided in a second period period[1], and an advertisement about Samsung Electronics is provided in a third period period[2].

In addition, the information 410, 420, and 430 about each of the at least one content may include information about a time at which the content is provided and a position at which the content is provided. Here, the position at which the content is provided may include an URL address of a server from which the content may be obtained.

For example, the terminal may confirm through the information 410 about a first advertisement that an advertisement about the smart phone is obtained from "http://galaxy_00.mp4" at 6:22:45 on Jun. 10, 2016. Further, the terminal may confirm through the information 420 about a the first program that a document program is obtained from "http://program A_20160926_00.mp4" at 6:23 on Jun. 10, 2016. Also, the terminal may confirm through the information 430 about a second advertisement that the advertisement about Samsung Electronics is obtained from "http://Samsung Electronics_00.mp4" at 6:53 on Jun. 10, 2016.

Figure 5:
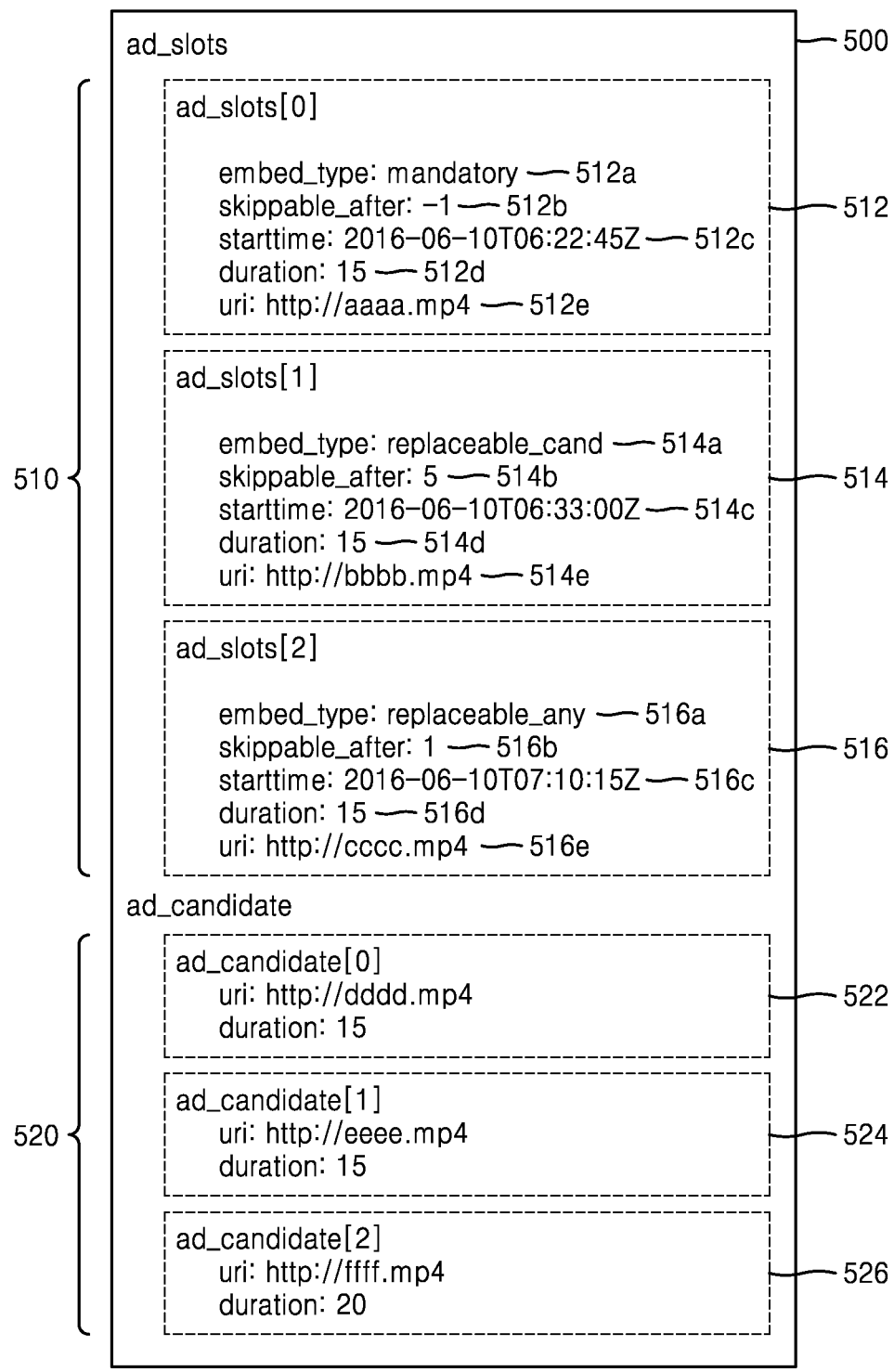
FIG. 5 is a diagram for explaining information about at least one content provided to a terminal according to another embodiment.

FIG. 5 is a diagram for explaining information 500 about at least one content provided to a terminal according to another embodiment.

Referring to FIG. 5, the information 500 about the at least one content according to an embodiment may include information 510 about advertisements provided in a plurality of advertisement slots. The information 510 about the advertisements provided in the plurality of advertisement slots may include information about whether the advertisements 512a, 514a, and 516a may be changed to other advertisements, durations 512b, 514b, and 516b for which the advertisements need to be reproduced, start times 512c, 514c and 516c of the advertisements, lengths 512d, 514d and 516d of the advertisements and URI addresses 512e, 514e and 516e of the advertisements.

Based on information 512 about a first advertisement slot, the terminal may confirm that an advertisement provided to the first advertisement slot ad_slot[0] is an unchangeable advertisement and that it is impossible to skip the advertisement. In addition, the terminal may confirm that a reproduction time of the advertisement provided to the first advertisement slot ad_slot[0] is at 6:22:45 on Jun. 10, 2016, a length of the advertisement is 15 seconds, and a URL address is http://aaaa.mp4.

Based on information 514 about a second advertisement slot, the terminal may confirm that an advertisement provided to the second advertisement slot ad_slot[1] is changeable to any one of at least one piece of preset candidate content 520 and that a skip operation of stopping reproduction of the advertisement in 5 seconds after the reproduction of the advertisement and reproducing another content is possible. Here, information about the at least one preset candidate content 520 may include information 522 about first candidate content, information 524 about second candidate content, and information 526 about third candidate content. The information about each candidate content may include information about a URL address and a length of the candidate content, but this is merely an example, and the information about the candidate content is not limited to the example described above. In addition, the terminal may confirm that a reproduction time of the advertisement provided to the second advertisement slot ad_slot[1] is at 6:33:00 on Jun. 10, 2016, a length of the advertisement is 15 seconds, and a URL address is http://bbbb.mp4.

Based on information 516 about a third advertisement slot, the terminal may confirm that an advertisement provided to the third advertisement slot ad_slot[2] is a changeable advertisement and that a skip operation of stopping reproduction of the advertisement in 1 second after the reproduction of the advertisement and reproducing another content is possible. In addition, the terminal may confirm that a reproduction time of the advertisement provided to the third advertisement slot ad_slot[2] is at 7:10:15 on Jun. 10, 2016, a length of the advertisement is 15 seconds, and a URL address is http://cccc.mp4.

Figure 6:
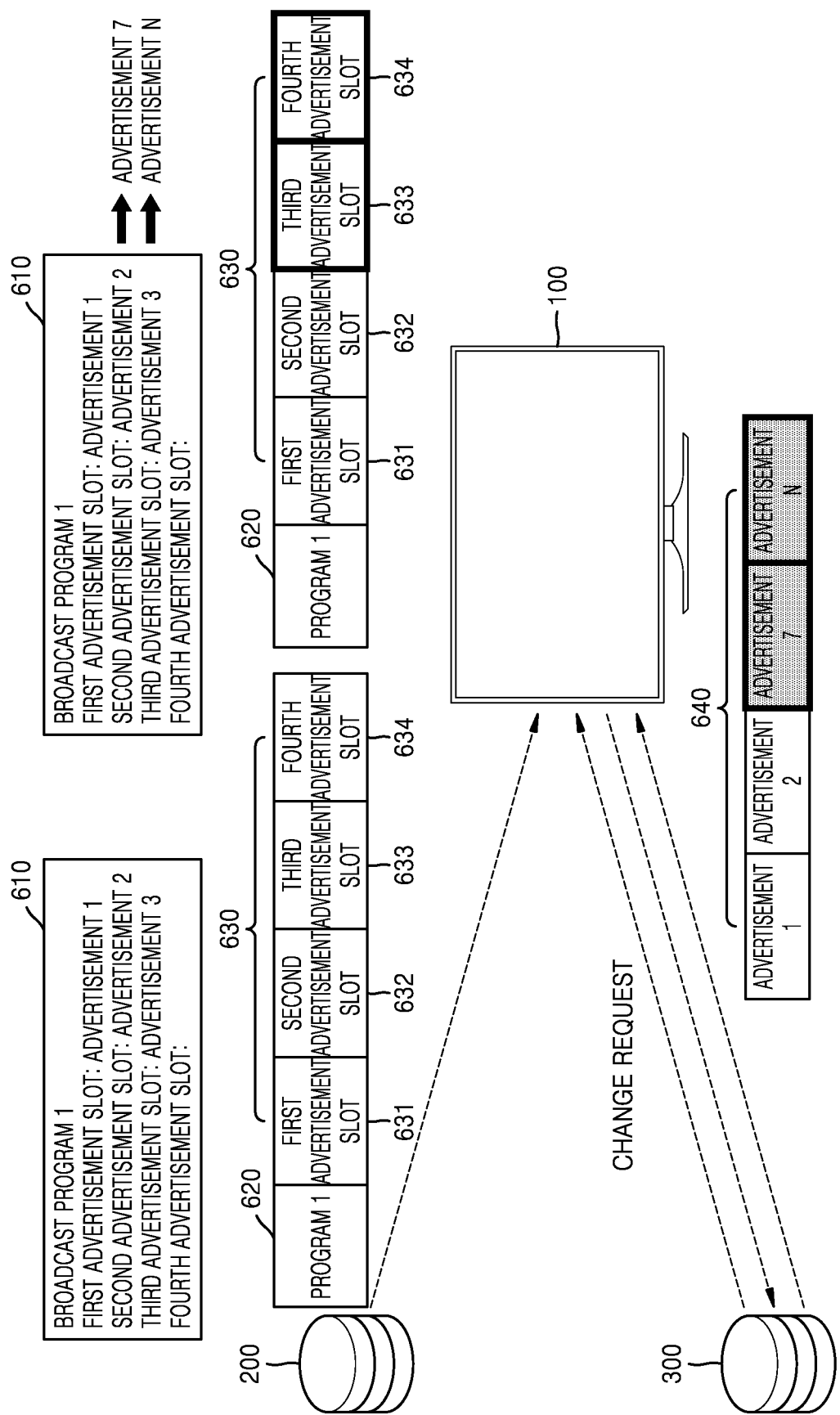
FIG. 6 is a diagram for explaining a method, performed by a terminal, of requesting a content change based on information about at least one content, according to an embodiment.

FIG. 6 is a diagram for explaining a method, performed by a terminal, of requesting a content change based on information 610 about at least one content, according to an embodiment.

Referring to FIG. 6, the terminal 100 may receive the information 610 about the at least one content from the first server 200. The information 610 about the at least one content may include information about a program 1 and information about a plurality of advertisements.

The terminal 100 may determine whether an advertisement that is not included in preference content of a user is present among the plurality of advertisements based on the information about the plurality of advertisements. Here, the information about the plurality of advertisements may include information about an advertisement 1 provided to a first advertisement slot 631, information about an advertisement 2 provided to a second advertisement slot 632, and information about an advertisement 3 provided to a third advertisement slot 633. The information about the plurality of advertisements may also include information that a fourth advertisement slot 634 is empty. Meanwhile, the first advertisement slot 631, the second advertisement slot 632, the third advertisement slot 633, and the fourth advertisement slot 634 represent time resource units in which advertisements provided after a stream 620 of the program 1 are allocated.

The terminal 100 may determine similarity between the advertisement 1 and preference information by comparing information about the advertisement 1 with the preference information. For example, the terminal 100 may determine the similarity by calculating a correlation coefficient between information about characters, storylines, genres, and sponsored products included in the information about the advertisement 1 and the preference information. In addition, the terminal 100 may determine the similarity with the preference information with respect to each of the advertisement 2 and the advertisement 3 by comparing the information about the advertisement 2 and the information about the advertisement 3 in the same manner as described above.

In addition, the terminal 100 according to an embodiment may change content that a user is unlikely to prefer among the plurality of advertisements to another content as a result of determining based on the preference information. For example, when the similarity between the advertisement 3 among the plurality of advertisements and the preference information is less than a preset value, the terminal 100 may transmit a request to change the advertisement 3 to preference content of the user. Here, the preference content of the user may be selected as any one of a plurality of obtained preference contents, or may be selected based on a user input.

Meanwhile, the terminal 100 may not change content even in case of the content that is not expected to be preferred by the user when the content corresponds to unchangeable content. In FIG. 6, it is assumed that the advertisement 3, which is not expected to be preferred by the user, is changeable content. Accordingly, the terminal 100 may transmit a request to the second server 300 to change the advertisement 3 to an advertisement 7, which is the preference content of the user. In addition, the terminal 100 may request that an empty advertisement slot be provided with any one of a plurality of preference contents when the empty advertisement slot is present in the information 610 about the at least one content. For example, the terminal 100 may transmit a request for an advertisement n among the plurality of preference contents to the second server 300.

In addition, when the terminal 100 determines that the advertisement 1 and the advertisement 2 are included in the preference content of the user in the case of the advertisement 1 and the advertisement 2, the terminal 100 may transmit a request for the advertisement 1 and the advertisement 2 to the advertisement providing server 300. However, this is merely an embodiment, and the terminal 100 may be set to receive an advertisement that is not a change target even though the terminal 100 does not make a separate request for the advertisement.

The terminal 100 according to an embodiment may receive a plurality of advertisements 640 including the advertisements 1, 2, 7 and n from the second server 300 in response to the request.

In addition, the terminal 100 according to an embodiment may store a viewing time and a reproduction count for each of the plurality of received advertisements 640 as feedback information. The terminal 100 may update the preference information about the content of the user based on the stored feedback information.

Figure 7:
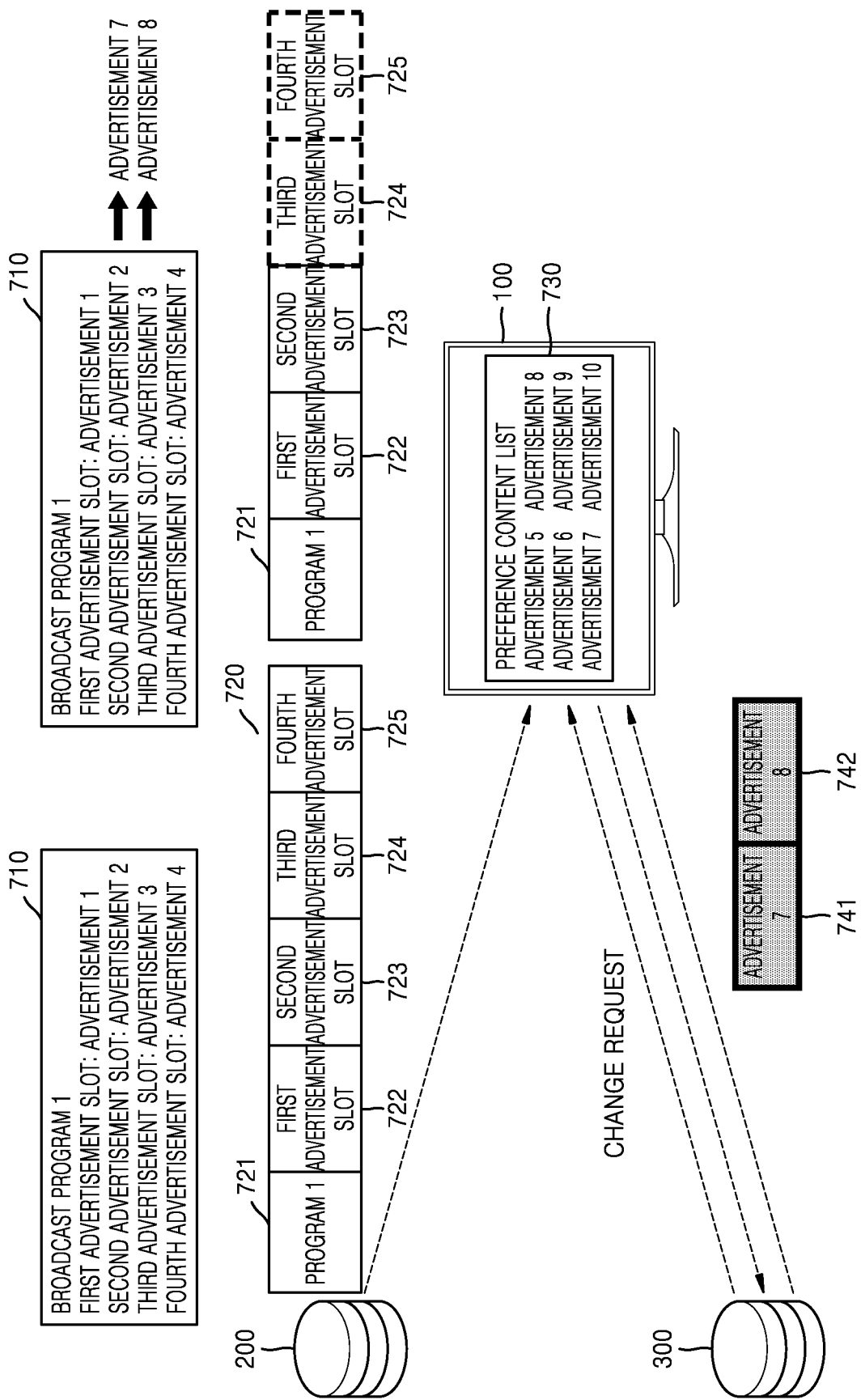
FIG. 7 is a diagram for explaining a method, performed by a terminal, of changing content based on a user input, according to an embodiment.

FIG. 7 is a diagram for explaining a method, performed by the terminal 100, of changing content based on a user input according to an embodiment.

Referring to FIG. 7, the terminal 100 may receive information 710 about at least one content from the first server 200. The information 710 about the at least one content may include information about the program 1 and information about a plurality of advertisements.

The terminal 100 may determine whether an advertisement that is not included in preference content of a user is present among the plurality of advertisements based on the information about the plurality of advertisements. Here, the information about the plurality of advertisements may include information about the advertisement 1 provided to a first advertisement slot 722, information about the advertisement 2 provided to a second advertisement slot 723, information about the advertisement 3 provided to a third advertisement slot 724. The information about the plurality of advertisements may also include information that a fourth advertisement slot 725 is empty. Meanwhile, the first advertisement slot 722, the second advertisement slot 723, the third advertisement slot 724, and the fourth advertisement slot 725 represent time resource units in which advertisements provided after a stream 720 of the program 1 are allocated.

The terminal 100 may determine whether the plurality of advertisements included in the at least one content are included in the preference content based on the information 710 about the at least one content and preference information about the content of a user of the terminal 100. For example, the terminal 100 may determine that the preference content does not include the advertisements 3 and 4 having similarity to the cosmetics, beauty, a movie actor B, and 20's female, which are included in the preference information being less than a preset value.

The terminal 100 according to an embodiment may display a previously stored list 730 of preference contents in order to change the advertisement 3 and the advertisement 4 to different contents when determining that the advertisement 3 and the advertisement 4 are not included in the preference content. Meanwhile, in FIG. 7, it is assumed that the advertisement 3 and the advertisement 4 are changeable contents. According to another example, when at least one of the advertisement 3 or the advertisement 4 is unchangeable content, the terminal 100 may change only the remaining content of the advertisement 3 and the advertisement 4, except for the unchangeable content.

The user of the terminal 100 may select at least one of the list 730 of preference contents to change the advertisements 3 and 4 to selected content. For example, the user may select the advertisement 7 and the advertisement 8 through an input device such as a remote controller or a touch input. Accordingly, the terminal 100 may transmit a request to the second server 300 to change the advertisements 3 and 4 to the advertisements 7 and 8, respectively. Here, the request transmitted to the second server 300 may include information about a time when the advertisement 3 and the advertisement 4 are provided, and information about the advertisement 7 and the advertisement 8.

The terminal 100 may receive advertisements 7 741 and advertisements 8 742 from the second server 300 upon request. The terminal 100 may reproduce the received advertisement 7 741 and the advertisement 8 742 in a third advertisement slot 724 and a fourth advertisement slot 725, respectively.

Figure 8:
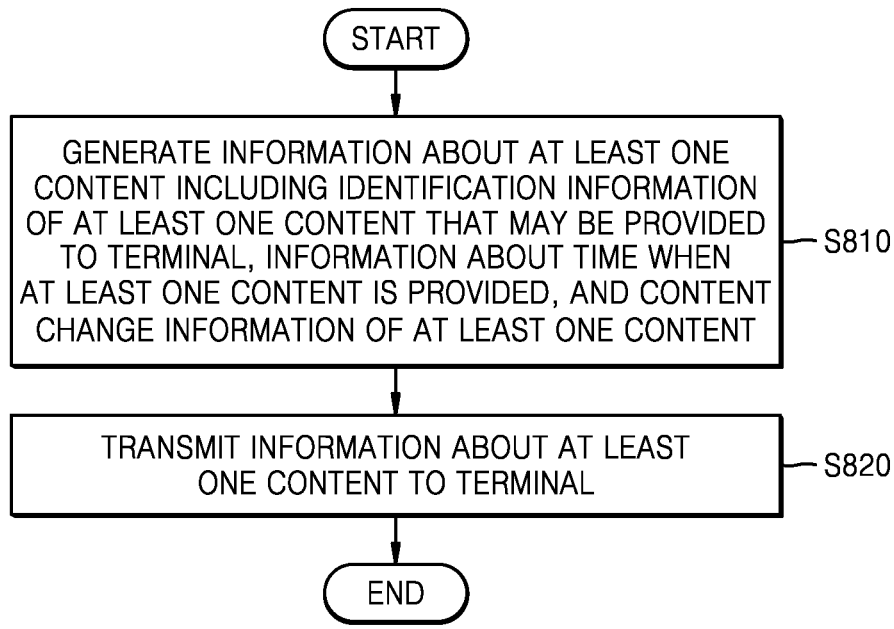
FIG. 8 is a flowchart illustrating a method, performed by a first server, of providing content, according to an embodiment.

FIG. 8 is a flowchart illustrating a method, performed by a first server, of providing content, according to an embodiment.

In operation S810, the first server generates information about at least one content including identification information of the at least one content that may be provided to a terminal, information about a time when the at least one content is provided, and content change information indicating whether the at least one content may be changed to another content.

The information about the at least one content according to an embodiment may include metadata of at least one broadcast program that the first server may provide to the terminal. In addition, the information about the at least one content may include information about advertisements provided between broadcast programs. Here, the information about the advertisements may include an advertisement slot indicating a time when the advertisement may be provided, position information (e.g., URL, URI) of a server that may provide the advertisement, and information indicating whether the advertisement may be changed to another advertisement.

However, this is merely an embodiment, and according to another example, the information about the advertisements may include not only the above-described information but also a name of a product that is an advertisement target, a type of the product, a name of a company of the product, and the like.

In operation S820, the first server transmits the information about the at least one content to the terminal.

The first server according to an embodiment may transmit the information about the at least one content to the terminal according to a request of the terminal. The terminal may change content that is not included in preference content of a user, based on the information about the at least one content received from the first server. Here, a method, performed by the terminal, of changing the content that is not included in the preference content of the user among the at least one content may correspond to the method described above with reference to FIGS. 1 to 7.

Figure 9:
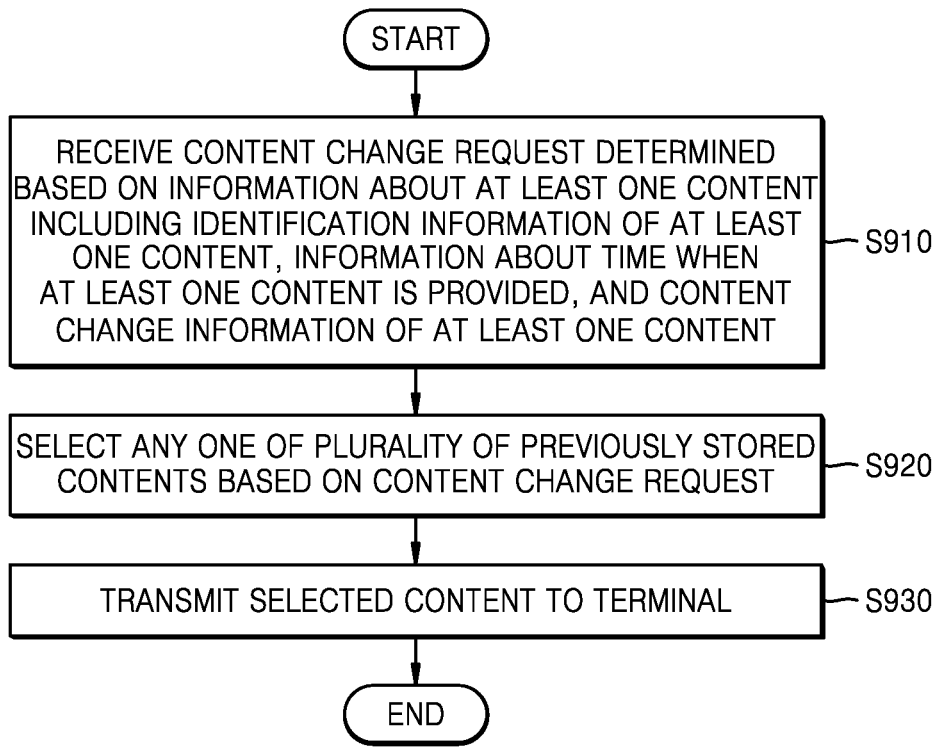
FIG. 9 is a flowchart illustrating a method, performed by a second server, of providing content, according to an embodiment.

FIG. 9 is a flowchart illustrating a method, performed by a second server, of providing content, according to an embodiment.

In operation S910, the second server receives a content change request determined based on information about at least one content including identification information of the at least one content, information about a time when the at least one content is provided, and content change information indicating whether the at least one content may be changed to another content from a terminal.

The second server according to an embodiment may previously provide the terminal with a list of contents that may be provided from the second server and information about the content. The terminal may select second content for changing the first content that is not included in preference content of a user from among the at least one content based on the list of contents and the information about the content previously provided from the second server.

In operation S920, the second server may select any one of a plurality of previously stored contents based on the content change request.

According to an embodiment, the content change request may include information about a time when the content to be changed is provided and identification information of the second content that the user desires to receive.

For example, when the content change request received by the second server includes identification information of an advertisement B, the second server may select the advertisement B from among a plurality of previously stored advertisements.

In operation S930, the second server may transmit the selected content to the terminal.

In accordance with the content change request received in operation 920 described above, the second server according to an embodiment may determine a time for transmitting the selected content to the terminal. For example, when the selected content is to be reproduced by the terminal in a third advertisement slot, the second server may transmit the selected content to the terminal before a preset buffer time from the third advertisement slot.

Figure 10:
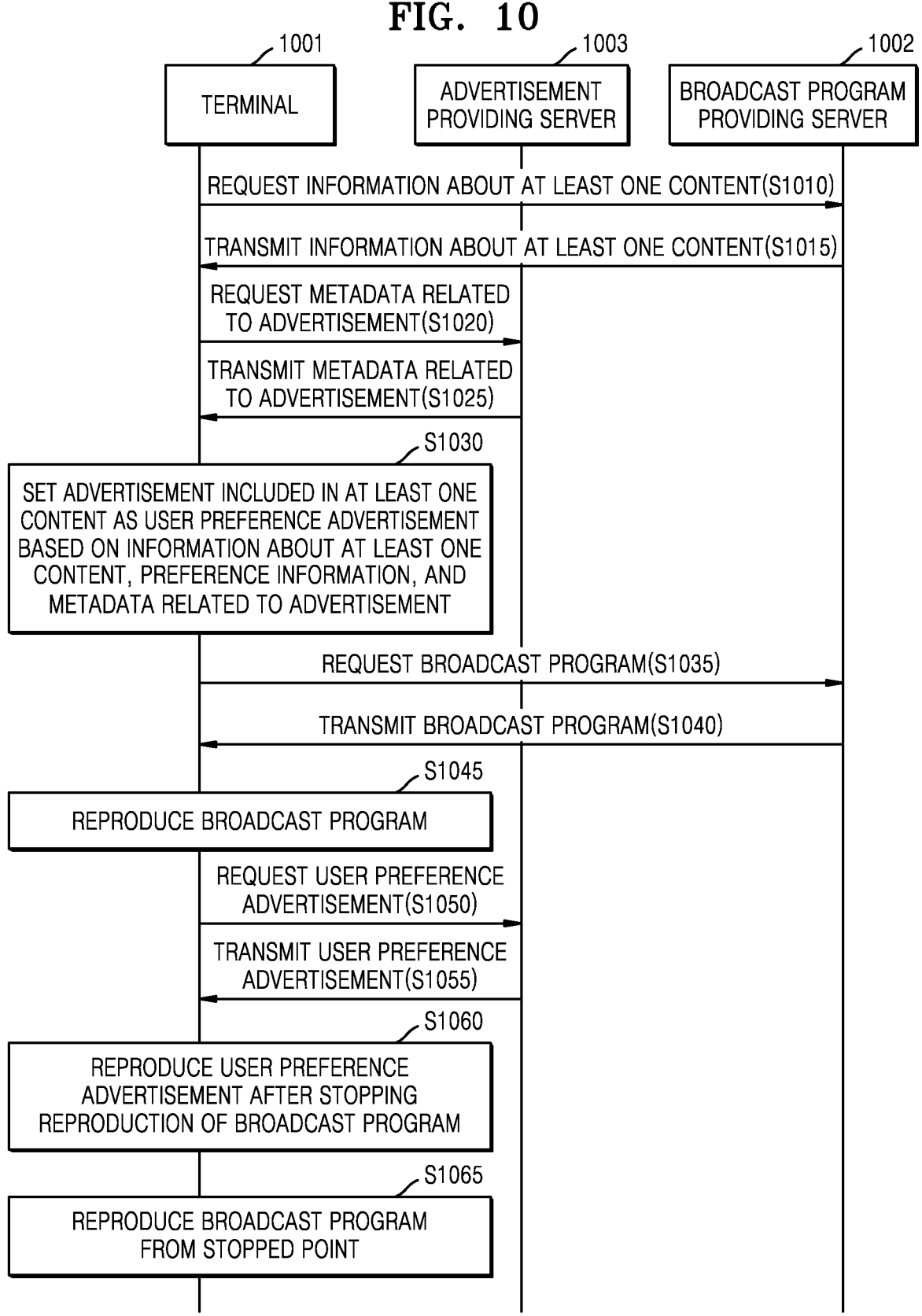
FIG. 10 is a flowchart illustrating a method, performed by a broadcast program providing server and an advertisement providing server, of providing content to a terminal according to a content providing system, according to an embodiment.

FIG. 10 is a flowchart illustrating a method, performed by a broadcast program providing server 1002 and an advertisement providing server 1003, of providing content to a terminal 1001 according to a content providing system, according to an embodiment.

In FIG. 10, the broadcast program providing server 1002 may correspond to a first server described above with reference to FIGS. 1 to 9, and the advertisement providing server 1003 may correspond to a second server described above with reference to FIGS. 1 to 9.

In operation S1010, the terminal 1001 may request the broadcast program providing server 1002 for information about at least one content.

Here, the information about the at least one content may include information about at least one broadcast program provided from the broadcast program providing server 1002 and information about advertisements provided before and after the at least one broadcast program. Further, the information about the advertisements may include an advertisement slot indicating a time when the advertisement may be provided, position information (e.g., URL, URI) of a server that may provide the advertisement, and content change information indicating whether the advertisement may be changed to another advertisement.

In operation S1015, the broadcast program providing server 1002 may transmit the information about the at least one content to the terminal 1001.

In operation S1020, the terminal 1001 may request the advertisement providing server 1003 for metadata about an advertisement.

The terminal 1001 according to an embodiment may request metadata related to a plurality of advertisements that the advertisement providing server 1003 may provide to the terminal 1001. Here, the metadata related to the plurality of advertisements may include a name of a product that is an advertisement target, a type of the product, a name of a company producing the product, and the like.

In operation S1025, the advertisement providing server 1003 may transmit the metadata related to the advertisement to the terminal 1001.

In operation S1030, the terminal 1001 may set an advertisement included in the at least one content as a user preference advertisement based on the information about the at least one content, preference information, and the metadata related to the advertisement.

The terminal 1001 according to an embodiment may confirm a list of advertisements provided to the terminal 1001 based on the information about the at least one content. The metadata of the advertisement may be included in the information about the at least one content. However, in the present embodiment, it is assumed that the information about the at least one content includes only an advertisement slot, location information of a server capable of providing an advertisement, and content change information of the advertisement.

Accordingly, the terminal 1001 may compare the metadata related to the advertisement received from the advertisement providing server 1003 with the information about the at least one content received from the broadcast program providing server 1002 to analyze an attribute of the advertisement provided to the terminal 1001. The terminal 1001 may compare the analyzed attribute of the advertisement with previously obtained preference information of the content of the user to determine whether an advertisement that the user does not prefer is present among the advertisements provided to the terminal 1001.

When an advertisement that is not preferred by the user is present among the advertisements provided to the terminal 1001, the terminal 1001 may select another advertisement for changing the advertisement that the user does not prefer based on the metadata related to the advertisement received from the advertisement providing server 1003. For example, the terminal 1001 may compare the metadata related to the advertisement with the preference information to select the advertisement 7 and the advertisement 8 that are determined to be preferred by the user among the plurality of advertisements. Accordingly, the terminal 1001 may change the advertisement 1, the advertisement 2, the advertisement 3, and the advertisement 4 that are provided to the terminal 1001 to the advertisement 1, the advertisement 2, the advertisement 7, and the advertisement 8 to set user preference advertisements. Here, it is assumed that the advertisement 3 and the advertisement 4 are all changeable advertisements.

In operation S1035, the terminal 1001 may request a broadcast program from the broadcast program providing server 1002.

In operation S1040, the broadcast program providing server 1002 may transmit the broadcast program to the terminal 1001.

In operation S1045, the terminal 1001 may reproduce the received broadcast program.

In operation S1050, the terminal 1001 may request the advertisement providing server 1003 for the user preference advertisement.

The terminal 1001 may confirm an advertisement providing time based on the information about the at least one content. The terminal 1001 may request the advertisement providing server 1003 for the user preference advertisement such that the user preference advertisement is received before a predetermined buffer time from the advertisement providing time to reproduce the advertisement seamlessly with a broadcast program being reproduced.

In operation S1055, the advertisement providing server 1003 may transmit the user preference advertisement to the terminal 1001.

In operation S1060, the terminal 1001 may reproduce the user preference advertisement after stopping reproduction of the broadcast program.

The terminal 1001 according to an embodiment may stop the reproduction of the broadcast program and reproduce the received user preference advertisement when the user preference advertisement is received at a time corresponding to a predetermine advertisement slot.

In operation S1065, the terminal 1001 may reproduce the broadcast program from a stopped point when the reproduction of the user preference advertisement ends.

Meanwhile, this is merely an example, and the terminal 1001 may reproduce a broadcast program different from the previously reproduced broadcast program after the reproduction of the user preference advertisement ends.

Figure 11:
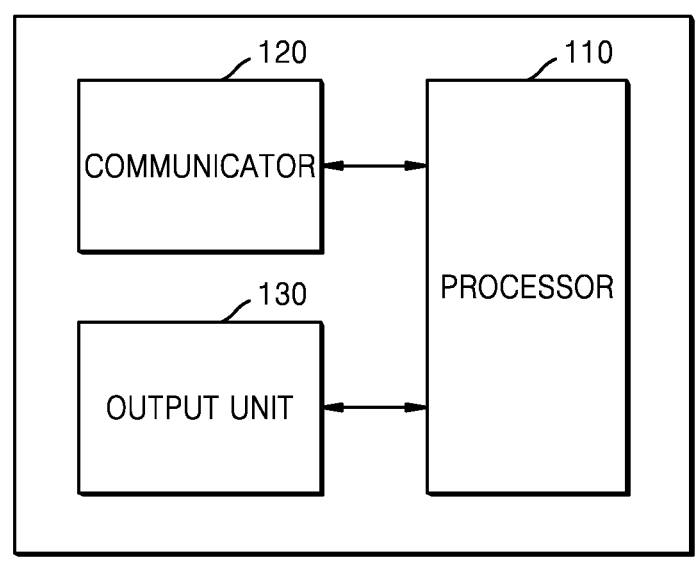
FIGS. 11 and 12 are block diagrams of a terminal that provides content according to an embodiment.
Figure 12:
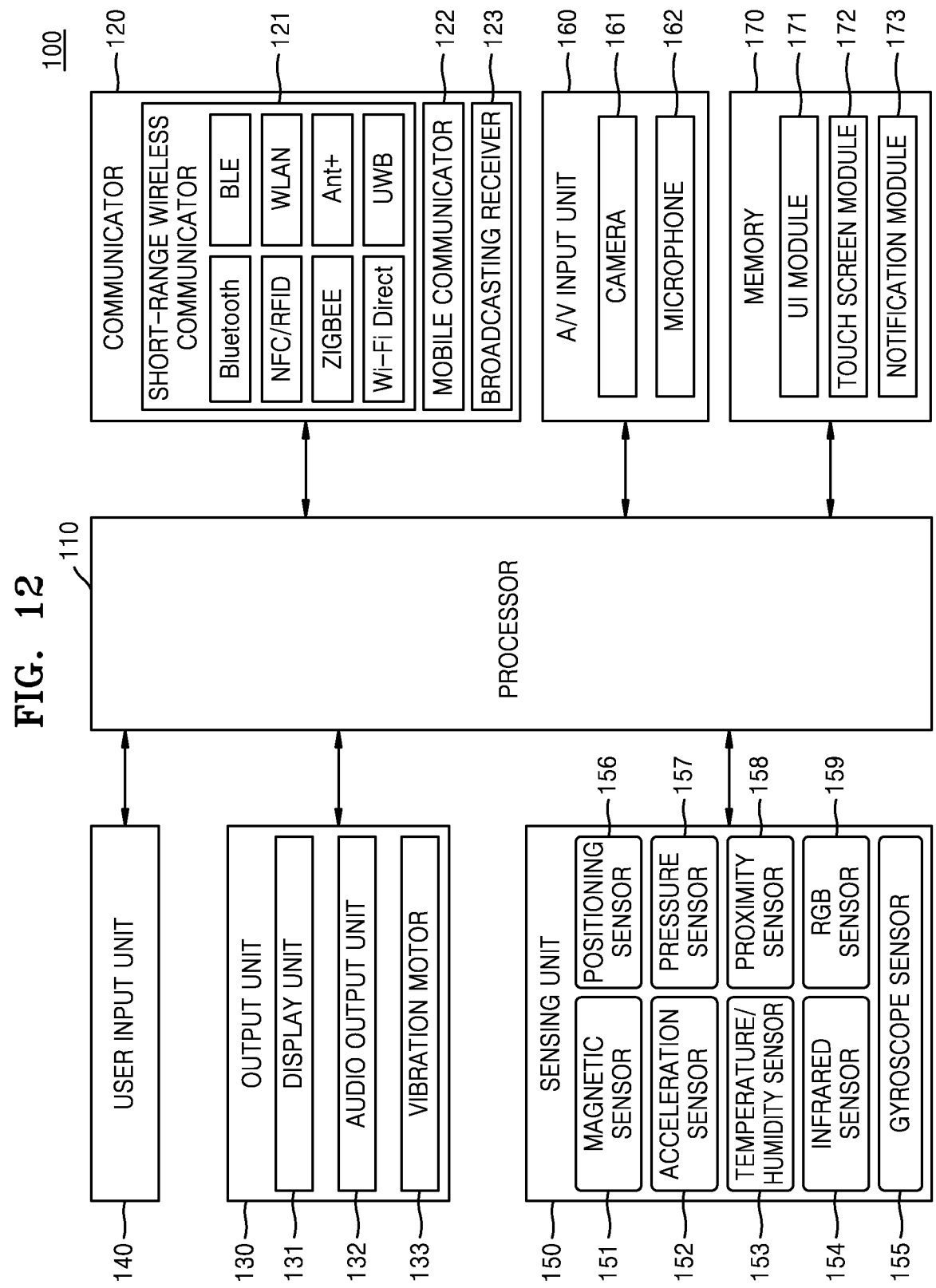

FIGS. 11 and 12 are block diagrams of the terminal 100 that provides content according to an embodiment.

As shown in FIG. 11, the terminal 100 according to an embodiment may include a communicator 120, a processor 110, and an output unit 130. However, all the illustrated elements are not essential elements. The terminal 100 may be implemented by more components than the illustrated components. The mobile terminal 100 may be implemented by fewer components than the illustrated components.

For example, as shown in FIG. 12, the terminal 100 according to an embodiment may include a user input unit 140, a sensing unit 150, an audio/video (A/V) input unit 160, and a memory 170 in addition to the communicator 120, a processor 110, and the output unit 130.

Hereinbelow, the foregoing elements will be described in detail.

The processor 110 may control an overall operation of the terminal 100. For example, the processor 110 may control all of the communicator 120, the output unit 130, the user input unit 140, the sensing unit 150, the A/V input unit 160, and the memory 170 by executing programs stored in the memory 170.

The processor 110 may determine whether at least one content is included in preference content, based on information about the at least one content provided to the terminal 100 and preference information of a user of the terminal about content. Here, the preference information may be generated by the processor 110 based on user information including at least one of a profile or an activity history of the user of the terminal.

In addition, the processor 110 may determine whether first content that is not included in preference content is unchangeable content based on content change information included in the information about the at least one content.

The processor 110 according to an embodiment may update the preference information based on information about at least one of a reproduction duration or a reproduction count of received second content when transmitting a request to change the first content.

The communicator 120 may include one or more elements that enable communication between the terminal 100 and a first server (not shown) or between the terminal 100 and a second server. For example, the communicator 120 may include a short-range wireless communicator 121, a mobile communicator 122, and a broadcasting receiver 123.

The short-range wireless communicator 121 may include, but is not limited to, a Bluetooth Low Energy (BLE) communicator, a near field communication (NFC) unit, a wireless local area network (WLAN) (WiFi) communicator, a ZigBee communicator, an infrared Data Association (IrDA) communicator, a WiFi Direct (WFD) communicator, an ultra wideband (UWB) communicator, and an Ant+ communicator.

The mobile communicator 122 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 123 receives a broadcast signal and/or broadcasting-related information from an external source through a broadcasting channel. The broadcasting channel may include a satellite channel and a terrestrial channel. According to implementation examples, the terminal 100 may not include the broadcasting receiver 123.

When determining that first content, which is not included in the preference content, is present in the at least one content, the communicator 120 may transmit, to a server, a request to change the first content to the second content included in the preference content based on previously stored information about the preference content. Here, the server may be a server that stores the second content.

In addition, the communicator 120 according to an embodiment may transmit a request to change the first content to the second content to the server when the processor 110 determines that the first content that is not included in the preferred content is changeable content.

The communicator 120 according to an embodiment may transmit a request for content included in the preferred content among a plurality of contents to the server when the plurality of contents that may be provided at a specific time are present.

In addition, the communicator 120 may transmit the request to change the first content to the second content before a predetermined buffer time from when the first content is provided.

The output unit 130 may be configured to output an audio signal, a video signal, or a vibration signal, and may include a display unit 131, an audio output unit 132, a vibration motor 133, etc.

The display unit 131 may display information processed by the terminal 100. For example, the display unit 131 may output the second content received from the server according to the request transmitted through the communicator 120.

Meanwhile, when the display unit 131 and a touch pad are constructed as a touch screen in a layer structure, the display unit 131 may be used as an input device as well as an output device. The display unit 131 may include at least one of a liquid crystal display (LCD), a thin film transistor (TFT) LCD, an organic light-emitting diode (OLED) display, a flexible display, a three-dimensional (3D) display, or an electrophoretic display. According to implementation types of the terminal 100, the terminal 100 may include two or more display units 131. In this case, the two or more display units 131 may be disposed to face each other by using a hinge.

The audio output unit 132 may output audio data received from the communicator 120 or stored in the memory 170. The audio output unit 132 may output an audio signal related to a function (e.g., call signal reception sound, message reception sound, and notification sound) performed in the terminal 100. The audio output unit 132 may include a speaker, a buzzer, or the like.

The vibration motor 133 outputs a vibration signal. For example, the vibration motor 133 may output a vibration signal corresponding to output of audio data or video data (e.g., call signal reception sound, message reception sound, etc.) The vibration motor 133 may also output a vibration signal when a touch is input to a touch screen.

The user input unit 140 may indicate a means through which the user controls the terminal 100. For example, the user input unit 140 may include, but is not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input unit 140 may receive a user input of selecting any one of a plurality of contents provided to the terminal 100. For example, the user input unit 140 may receive the user input of selecting any one of a plurality of contents provided at a specific time displayed through the output unit 130, based on the information about the at least one content. Further, according to another example, the user input unit 140 may receive the user input of selecting any one of a plurality of contents that may be provided to the terminal 100.

The sensing unit 150 may sense a state of the terminal 100 or a state around the terminal 100 and transfer sensed information to the processor 110.

The sensing unit 150 may include, but is not limited to, at least one of a magnetic sensor 151, an acceleration sensor 152, a temperature/humidity sensor 153, an infrared sensor 154, a gyroscope sensor 155, a positioning sensor (e.g., a global positioning system (GPS)) 156, a pressure sensor 157, a proximity sensor 158, and a red/green/blue (RGB) sensor (or an illuminance sensor) 159. A function of each sensor may be intuitively construed from a name of each sensor by those of ordinary skill in the art, and thus will not be described in detail.

The A/V input unit 160 inputs an audio signal or a video signal and may include a camera 161, a microphone 162, etc. The camera 161 obtains an image frame such as a still image or a moving image in a video communication mode or a photographing mode through an image sensor. The image captured by the image sensor is processed by the processor 110 or a separate image processor (not shown).

An image frame processed by the camera 161 is stored in the memory 170 or transmitted to an external source through the communicator 120. Two or more cameras 161 may be provided according to a structure aspect of the terminal 100.

The microphone 162 receives an external audio signal and processes the received signal into electric voice data. For example, the microphone 162 may receive an audio signal from an external device or a speaker. The microphone 162 may use various noise cancellation algorithms for canceling noise generated during reception of the external audio signal.

The memory 170 may store a program for processing and control of the processor 110 and store input/output data (e.g., the information about the at least one content, the preference information, information about the preference content, etc.)

The memory 170 may include a storage medium of at least one type of a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk. The terminal 100 may operate a web storage or a cloud server that performs a storage function of the memory 170 on the Internet.

The programs stored in the memory 170 may be classified into a plurality of modules depending on a function thereof, e.g., a user interface (UI) module 171, a touch screen module 172, a notification module 173, etc.

The UI module 171 provides a specialized UI or graphical UI (GUI) interworking with the terminal 100 for each application. The touch screen module 172 may sense a touch gesture of a user on a touch screen and transfer information about the touch gesture to the processor 110. The touch screen module 172 according to an embodiment may recognize and analyze a touch code. The touch screen module 172 may be configured as separate hardware including a controller.

Various sensors may be arranged inside or near the touch screen for sensing the touch on the touch screen or a close touch. A tactile sensor is an example of a sensor for sensing the touch on the touch screen. The tactile sensor refers to a sensor for sensing the touch of a specific object at a level of human feeling or at a higher level than that. The tactile sensor may sense a variety of information such as the roughness of a contact surface, the hardness of a contact material, and the temperature of a contact point.

In addition, a proximity sensor is an example of a sensor for sensing the touch on the touch screen.

The proximity sensor refers to a sensor for sensing the presence or absence of an object approaching a predetermined detection surface or a nearby object without mechanical contact using the force of an electromagnetic field or infrared rays. Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. The user's touch gesture may include a tap, a touch & hold, a double tap, a drag, panning, a flick, a drag & drop, a swipe, etc.

The notification module 173 generates a signal for notifying that an event of the terminal 100 has occurred. Examples of the event occurring in the terminal 100 may include call signal reception, message reception, key signal input, schedule notification, connection with an electronic device, etc. The notification module 173 outputs a notification signal as a video signal through the display unit 131, an audio signal through the audio output unit 132, and/or a vibration signal through the vibration motor 133.

Figure 13:
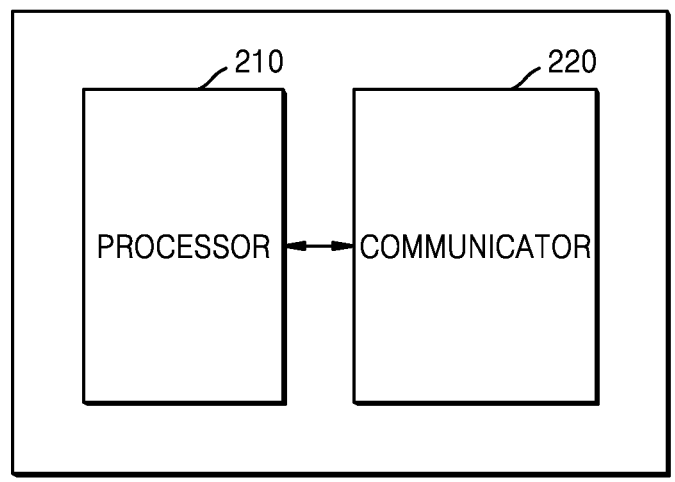
FIG. 13 is a block diagram of a first server that provides content according to an embodiment.

FIG. 13 is a block diagram of the first server 200 that provides content according to an embodiment.

As shown in FIG. 13, the first server 200 according to an embodiment may include a processor 210 and a communicator 220. However, all the illustrated elements are not essential elements. The first server 200 may be implemented by more components than the illustrated components. The first server 200 may be implemented by fewer components than the illustrated components.

For example, the first server 200 may further include a memory (not shown).

The processor generates information about at least one content including identification information of the at least one content that may be provided to a terminal, information about a time when the at least one content is provided, and content change information indicating whether the at least one content may be changed to another content.

In addition, the processor 210 may combine the content and the information about the at least one content to generate a data stream. For example, the processor 210 may generate the data stream by combining data of the broadcast program 1, identification information of a plurality of advertisements provided after the broadcast program 1, and information about a providing time.

The communicator 220 may include one or more components that allow communication between the first server 200 and a terminal (not shown) or between the first server 200 and another server (not shown).

The communicator 220 transmits the information about the at least one content to the terminal. For example, when the first server 200 receives a request for the information about the at least one content from the terminal, the communicator 220 may transmit the information about the at least one content to the terminal.

Meanwhile, according to another embodiment, the communicator 220 may transmit the data stream generated by combining the content and the information about the at least one content by the processor 210 to the terminal.

Figure 14:
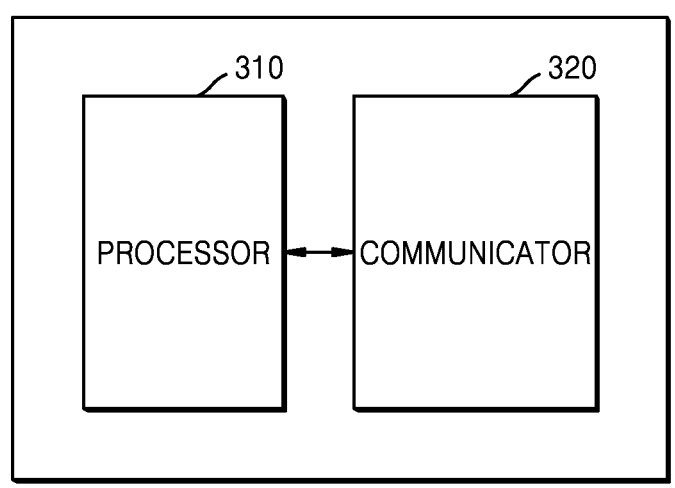
FIG. 14 is a block diagram of a second server that provides content according to an embodiment.

FIG. 14 is a block diagram of the second server 300 that provides content according to an embodiment.

As shown in FIG. 14, the second server 300 according to an embodiment may include a communicator 310 and a processor 320. However, all the illustrated elements are not essential elements. The second server 300 may be implemented by more components than the illustrated components. The second server 300 may be implemented by fewer components than the illustrated components.

The communicator 310 may include one or more components that allow communication between the second server 300 and a terminal (not shown) or between the second server 300 and another server (not shown).

The communicator 310 receives a content change request determined based on information about at least one content including identification information of the at least one content, information about a time when the at least one content is provided, and content change information indicating whether the at least one content may be changed to another content.

Meanwhile, the communicator 310 according to an embodiment may previously provide the terminal with information on a list of contents that may be provided by the second server 300 and information about the contents. The terminal may select second content for changing first content that is not included in preference content of a user from among the at least one content based on the list of contents and the information of the contents previously provided from the second server.

In addition, the communicator 310 may transmit the selected content to the terminal.

The processor 320 may select any one of a plurality of previously stored contents based on a received content change request.

According to an embodiment, the content change request may include information about a time when the content to be changed is provided and identification information of the second content that the user desires to receive. The processor 320 may select content corresponding to the identification information of the second content included in the content change request from among the plurality of previously stored contents.

In addition, the processor 310 may determine a time to transmit the selected content to the terminal based on the content change request. For example, when the selected content is to be reproduced in the terminal in a first advertisement slot, the processor 310 may determine a transmission time of the selected content such that the selected content may be provided to the terminal before a predetermined buffer time from the first advertisement slot.

The method according to an embodiment of the present disclosure may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those of skill in the art of the computer software field. Examples of the computer-readable recording medium may include magnetic media such as a hard disk, a floppy disk, and magnetic tape, optical media such as compact disk read only memory (CD-ROM) and digital versatile disk (DVD), magneto-optical media such as a floptical disk, and a hardware device especially configured to store and execute a program command, such as read only memory (ROM), random access memory (RAM) and flash memory, etc. Further, examples of the program commands include machine language code created by a compiler and high-level language code executable by a computer using an interpreter.

The device according to an embodiment may include a processor, a memory for storing program data and executing it, a permanent storage such as a disk drive, a communications port for communicating with external devices, and user interface devices, such as a touch panel, a key, a button, etc. Methods implemented with a software module or algorithm may be stored as computer-readable code or program commands executable on the processor on computer-readable recording media. Here, examples of the computer-readable recording media may include a magnetic storage medium (e.g., read-only memory (ROM), random-access memory (RAM), a floppy disk, a hard disk, etc.) and an optical medium (e.g., a compact disc-ROM (CD-ROM), a digital versatile disc (DVD), etc. The computer-readable recording medium may also be distributed over network-coupled computer systems such that computer-readable code is stored and executed in a distributed fashion. The medium may be read by a computer, stored in a memory, and executed by a processor.

Reference numerals have been used in embodiments illustrated in the attached drawings, and particular terms have been used to describe the embodiments, but the embodiments are not limited to the particular terms, and the present disclosure may include any element that may be generally conceived by those of ordinary skill in the art.

The embodiment may be represented by block components and various process operations. Such functional blocks may be implemented by various numbers of hardware and/or software components which perform specific functions. For example, the embodiment may employ various integrated circuit components, e.g., memory elements, processing elements, logic elements, look-up tables, and the like, which may carry out a variety of functions under the control of one or more microprocessors or other control devices. The embodiment may also employ the same type or different types of cores or different types of CPUs. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the embodiment may employ any number of conventional techniques for electronics configuration, signal processing and/or control, data processing and the like. The term "mechanism", "element", "means", or "component" is used broadly and is not limited to mechanical or physical embodiments. The term may include a series of routines of software in conjunction with the processor or the like.

The particular implementations shown and described in an embodiment are illustrative examples and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

Herein (especially, in the claims), the use of "the" and other demonstratives similar thereto may correspond to both a singular form and a plural form. Also, when a range is described in an embodiment, the range has to be regarded as including disclosure adopting any individual element within the range (unless described otherwise), and it has to be regarded as having written in the detailed description each individual element included in the range. Unless the order of operations of a method according to an embodiment is explicitly mentioned or described otherwise, the operations may be performed in a proper order. The embodiments are not limited to the order the operations are mentioned. The use of all examples or exemplary terms (e.g., "etc.,", "and (or) the like", and "and so forth") in an embodiment is merely intended to describe the embodiment in detail, and the scope of the embodiment is not necessarily limited by the examples or exemplary terms unless defined by the claims. Also, one of ordinary skill in the art may appreciate that the present disclosure may be configured through various modifications, combinations, and changes according to design conditions and factors without departing from the spirit and technical scope of the present disclosure and its equivalents.

The invention claimed is:

1. A method, performed by a terminal, of providing content, the method comprising:
    determining, by a processor of the terminal, whether at least one content among contents to be output on a display of the terminal is included in a preference content, based on information about the at least one content provided to the terminal and preference information of a user of the terminal;
    based on the determining that a first content, which is not included in the preference content, is present in the contents, identifying, by the processor, a second content among candidate contents based on previously stored information about the candidate contents, wherein the previously stored information comprises identification information and location information of the candidate contents;
    transmitting, by a communicator of the terminal to a server, a request for the second content based on the previously stored information of the second content, the request comprising a start time and an end time of a time period within which the first content is scheduled to be output within the contents;
    receiving, by the communicator from the server, the second content at a predetermined buffer time prior to the start time; and
    outputting the second content received from the server on the display instead of the first content, within the time period at which the first content was previously scheduled to be output.

2. The method of claim 1, further comprising:
    generating, by the processor, the preference information of the user based on user information comprising at least one of a profile or an activity history of the user.

3. The method of claim 1, wherein the information about the at least one content comprises at least one of identification information of the at least one content, information about a time when the at least one content is provided, or content change information indicating whether the at least one content is changeable to another content.

4. The method of claim 1, wherein the information about the at least one content comprises identification information of the contents and information about a time when each of the contents is providable, and
    the method further comprises:
        based on at least two contents providable at a specific time being present in the contents, transmitting, by the communicator, a request for a third content which is included in the preference content and in the at least two contents.

5. The method of claim 1, wherein the request further comprises identification information of the second content.

6. The method of claim 1, wherein
    the predetermined buffer time is defined by a time of transmission of the second content that is determined by the server based on the start time indicated in the request received from the communicator by the server.

7. The method of claim 1, further comprising:
    updating, by the processor, the preference information based on at least one of a reproduction duration of the second content or a reproduction count of the second content.

8. A terminal for providing content, the terminal comprising:
    a processor configured to:
        determine whether at least one content among contents to be output on a display of the terminal is included in a preference content, based on information about the at least one content provided to the terminal and preference information of a user of the terminal, and
        based on a result of the determining that a first content, which is not included in the preference content, is present in the contents, identify a second content among candidate contents based on previously stored information about the candidate contents, wherein the previously stored information comprises identification information and location information of the candidate contents;
    a communicator coupled to the processor and configured to transmit, to a server, a request for the second content based on the previously stored information of the second content, the request comprising a start time and an end time of a time period within which the first content is scheduled to be output within the contents, and to receive, from the server, the second content at a predetermined buffer time prior to the start time; and
    an output unit coupled to the processor and configured to output on the display the second content, received from the server, instead of the first content, within the time period at which the first content was previously scheduled to be output.

9. The terminal of claim 8, wherein the processor is further configured to generate the preference information of the user based on user information comprising at least one of a profile or an activity history of the user.

10. The terminal of claim 8, wherein the information about the at least one content comprises at least one of identification information of the at least one content, information about a time when the at least one content is provided, or content change information indicating whether the at least one content is changeable to another content.

11. The terminal of claim 8, wherein the information about the at least one content comprises identification information of the contents and information about a time when each of the contents is providable, and wherein the communicator is further configured to, based on at least two contents providable at a specific time being present in the contents, transmit a request for a third content which is included in the preference content and in the at least two contents.

12. The terminal of claim 8, wherein the request further comprises identification information of the second content.

13. The terminal of claim 8, wherein the predetermined buffer time is defined by a time of transmission of the second content that is determined by the server based on the start time indicated in the request received from the communicator by the server.

14. The terminal of claim 8, wherein the processor is further configured to update the preference information based on at least one of a reproduction duration of the second content or a reproduction count of the second content.

15. A non-transitory computer-readable recording medium having recorded thereon a program which, when executed by a processor of a terminal, causes the processor to execute a method including:

determining whether at least one content among contents to be output on a display of the terminal is included in a preference content, based on information about the at least one content provided to the terminal and preference information of a user of the terminal;

based on the determining that a first content, which is not included in the preference content, is present in the contents, identifying a second content among candidate contents based on previously stored information about the candidate contents, wherein the previously stored information comprises identification information and location information of the candidate contents;

transmitting, to a server, a request for the second content based on the previously stored information of the second content, the request comprising a start time and an end time of a time period within which the first content is scheduled to be output within the contents;

receiving, from the server, the second content at a predetermined buffer time prior to the start time; and outputting the second content received from the server on the display instead of the first content, within the time period at which the first content was previously scheduled to be output.

16. The method of claim 1, further comprising:

obtaining information about the contents, from the server, the contents including the first content and a third content that are to be output successively with respect to time; and determining that the third content is included in the preference content, wherein the transmitting the request further comprises transmitting, by the communicator to the server, a request for the third content, wherein the receiving the second content further comprises receiving, by the communicator from the server, the third content, and wherein the outputting further comprises outputting the third content after the outputting the second content.

* * * * *